April 14, 1931.   E. S. MUMMERT   1,801,103
SUMP DRAIN PUMP
Filed Feb. 18, 1928
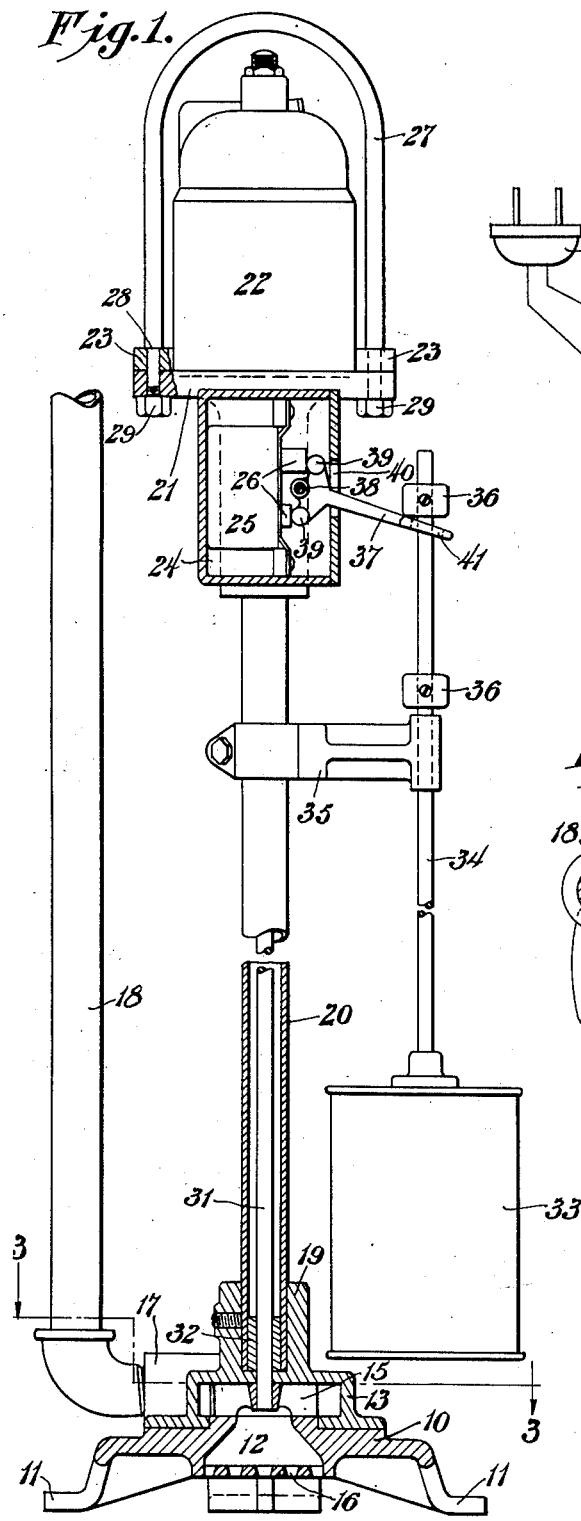
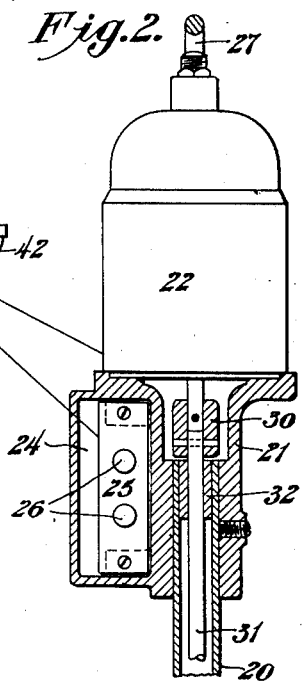
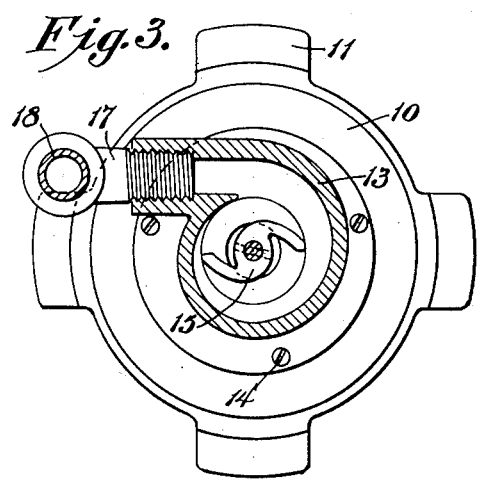
INVENTOR
E. S. Mummert
BY
Liggers & Adams
ATTORNEYS Patented Apr. 14, 1931

1,801,103

UNITED STATES PATENT OFFICE

ERVIN S. MUMMERT, OF HANOVER, PENNSYLVANIA, ASSIGNOR TO MUMMERT-DIXON COMPANY, OF HANOVER, PENNSYLVANIA, A CORPORATION OF PENNSYLVANIA

SUMP-DRAIN PUMP

Application filed February 18, 1928. Serial No. 255,414.

This invention relates to motor operated pumps and aims, among other objects to provide an improved, simple, inexpensive and portable pump adapted to be used for draining cellars and the like.

In the accompanying drawing Fig. 1 is an elevational view partly in section of a sump drain pump embodying the invention:

Fig. 2 is a fragmentary sectional view of a part of the pump shown in Fig. 1, the motor being shown in elevation; and Fig. 3 is a sectional view taken on the line 3—3 of Fig. 1.

Referring particularly to the drawing the embodiment of the pump there shown includes a base member on which is mounted a rotary pump and a motor for driving the pump mounted on a standard and having a shaft connected to the pump passing through the standard. Also provision is made for actuating the motor switch by means of a float control.

Herein, there is shown a base 10 having feet 11, and an intake opening 12 passing substantially centrally through the base. On the top of the base is mounted a pump casing 13 which may be suitably secured to the base by means of screw bolts 14 or the like. Within the casing is a rotor 15 arranged to suck the water through a grating or screen 16 in the bottom of the intake opening 12 and discharge it centrifugally through a lateral conduit 17 into a pipe or hose 18 leading to a suitable point of discharge. The pump casing may be and preferably is made of a single casting having a vertical socket 19 within which a tubular standard 20 such as ordinary pipe, may be secured by means of a set screw or the like.

To support the motor on the standard, there is shown a bracket 21, adapted to telescope over the end of the tube 20 and secured thereto by a set screw or the like and this bracket is so shaped on its upper face as to receive a standard electric motor 22 which has perforated ears 23 at diametrically opposite sides of the motor casing. Also the bracket is shown as having a box-like recess or switch housing 24 at one side of the standard to receive a switch 25 such as an ordinary wall switch having two push buttons 26 to control the circuit to the motor.

To secure the motor to the bracket, there is shown a handle or bail member 27 which may be made of ordinary steel rod and which, in the present instance, has reduced end portions adapted to pass through the perforations in the ears 23 on the motor casing and aligned openings in the bracket, the arrangement being such that the shoulders 28 thereon engage the upper faces of the ears and nuts 29 on the threaded ends of the bail clamp the ears on the bracket. Thus, the bail or handle member 27 serves the double purpose of enabling the whole device to be carried from place to place or suspended by it and also to secure the motor in its proper position.

As shown in Fig. 2, the motor shaft is connected by means of a collar or coupling 30 to a pump drive shaft 31 which passes through the tubular standard 20 and has bronze bushing or other suitable oilless bearings 32 in the ends of the standard. The lower end of the shaft 31 is adapted to be connected to the rotor of the pump by means of a transverse pin or other suitable securing means.

Herein, the switch is adapted to be controlled by a float 33, mounted on a rod 34 and guided for vertical movement by means of a bracket 35 which is secured to the tubular standard. At the upper end of the rod 34 there is secured two adjustable stops 36 which cooperate with a lever 37 pivoted as at 38 on the inside of the switch box and having a pair of arms 39 to actuate the push buttons 26. The lever projects through a slot 40 in the switch box and has an eye or fork 41 in its end surrounding the rod 34.

For small pumps, the motor of this installation is adapted to be connected to an ordinary household circuit by means of a cord and plug connection 42.

From the foregoing description, it will be seen that the sump drain pump herein described can be made very easily and economically; that it is easy to install; that it has no exposed running parts which are likely to engage the clothing of children and that there are no complicated parts likely to get out of order. The pump may be set in a depression or sump in an ordinary household cellar and may be left alone to operate automatically whenever the cellar becomes flooded. Also, it may be suspended by means of a rope and used in wells and the like or in connection with sewer work.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

A sump drain pump of the class described comprising, in combination, a base having integral legs and inlet conduit; a flanged pump casing secured to the base and having a vertical socket; a centrifugal pump in said casing; an outlet conduit extending through one side of the casing; a tubular standard secured within said vertical socket; a motor-supporting bracket secured to the upper end of said standard; a motor on the bracket; a bail-shaped handle having means to secure the motor casing to the bracket; and a pump-driving shaft extending through the tubular standard connected to the motor shaft.

In testimony, that I claim the foregoing as my own, I have hereto affixed my signature.

ERVIN S. MUMMERT.